(12) United States Patent
Teggatz et al.

(10) Patent No.: US 10,186,897 B2
(45) Date of Patent: *Jan. 22, 2019

(54) SCALABLE HARVESTING SYSTEM AND METHOD

(71) Applicant: TRIUNE IP LLC, Plano, TX (US)

(72) Inventors: Ross E. Teggatz, The Colony, TX (US); Ken Moore, Dallas, TX (US); Edson Calixto, Carrollton, TX (US); Emanuel Stingu, Dallas, TX (US)

(73) Assignee: TRIUNE IP LLC, Plano, TX (US)

( * ) Notice: Subject to any disclaimer, the term of this patent is extended or adjusted under 35 U.S.C. 154(b) by 112 days.

This patent is subject to a terminal disclaimer.

(21) Appl. No.: 15/257,561

(22) Filed: Sep. 6, 2016

(65) Prior Publication Data

US 2016/0372967 A1 Dec. 22, 2016

Related U.S. Application Data

(63) Continuation of application No. 13/772,190, filed on Feb. 20, 2013, now Pat. No. 9,438,053.

(60) Provisional application No. 61/601,138, filed on Feb. 21, 2012.

(51) Int. Cl.
| | | |
|---|---|---|
| *H01M 10/44* | (2006.01) | |
| *H01M 10/46* | (2006.01) | |
| *H02J 7/35* | (2006.01) | |
| *H02J 7/00* | (2006.01) | |
| *H02J 7/02* | (2016.01) | |
| *H02J 50/10* | (2016.01) | |
| *H02J 50/00* | (2016.01) | |
| *H02S 20/30* | (2014.01) | |
| *H02S 40/34* | (2014.01) | |
| *H02S 40/38* | (2014.01) | |
| *H02J 50/12* | (2016.01) | |

(52) U.S. Cl.
CPC .............. *H02J 7/355* (2013.01); *H02J 7/007* (2013.01); *H02J 7/0052* (2013.01); *H02J 7/025* (2013.01); *H02J 7/027* (2013.01); *H02J 7/35* (2013.01); *H02J 50/00* (2016.02); *H02J 50/10* (2016.02); *H02J 50/12* (2016.02); *H02S 20/30* (2014.12); *H02S 40/34* (2014.12); *H02S 40/38* (2014.12)

(58) Field of Classification Search
CPC .. H02J 7/025; H02J 3/383; H02J 50/12; H02J 7/007; H02J 50/10
USPC ........................................................ 320/108
See application file for complete search history.

(56) References Cited

U.S. PATENT DOCUMENTS

| | | | |
|---|---|---|---|
| 7,808,127 B2 | 10/2010 | Teggatz et al. | |
| 7,827,334 B2 | 11/2010 | Teggatz et al. | |
| 7,859,911 B2 | 12/2010 | Teggatz et al. | |
| 7,982,492 B2 | 7/2011 | Atrash et al. | |

(Continued)

FOREIGN PATENT DOCUMENTS

| | | |
|---|---|---|
| WO | 2015/195403 A2 | 12/2015 |
| WO | 2016/019137 A2 | 2/2016 |
| WO | 2016/019139 A1 | 2/2016 |

*Primary Examiner* — Nghia Doan
(74) *Attorney, Agent, or Firm* — Jackson Walker LLP; Christopher J. Rourk

(57) ABSTRACT

A scalable energy harvesting system comprising at least one charging control device, at least one energy storage device responsive to the charging control device, at least one energy harvesting device operatively coupled to the charging control device, and a plurality of bus based power connectors operatively coupled to the charging control device.

19 Claims, 9 Drawing Sheets

(56) References Cited

U.S. PATENT DOCUMENTS

| | | |
|---|---|---|
| 8,013,472 B2 | 9/2011 | Adest et al. |
| 8,102,713 B2 | 1/2012 | Teggatz et al. |
| 8,102,718 B2 | 1/2012 | Teggatz et al. |
| 8,300,375 B2 | 10/2012 | Teggatz et al. |
| 8,339,096 B2 * | 12/2012 | Osada ................ G06K 19/0701 320/108 |
| 8,373,436 B2 | 2/2013 | Atrash et al. |
| 8,408,900 B2 | 4/2013 | Teggatz et al. |
| 8,441,866 B2 | 5/2013 | Teggatz et al. |
| 8,461,847 B2 | 6/2013 | Teggatz et al. |
| 8,552,336 B2 | 10/2013 | Blackall et al. |
| 8,583,037 B2 | 11/2013 | Atrash et al. |
| 8,584,961 B2 | 11/2013 | Teggatz et al. |
| 8,664,745 B2 | 3/2014 | Teggatz et al. |
| 8,687,385 B2 | 4/2014 | Teggatz et al. |
| 8,693,261 B2 | 4/2014 | Teggatz et al. |
| 8,704,450 B2 | 4/2014 | Chen et al. |
| 8,743,522 B2 | 6/2014 | Teggatz et al. |
| 8,768,455 B2 | 7/2014 | Teggatz et al. |
| 8,896,318 B2 | 11/2014 | Teggatz et al. |
| 8,964,418 B2 | 2/2015 | Atrash et al. |
| 9,083,391 B2 | 7/2015 | Teggatz et al. |
| 9,089,029 B2 | 7/2015 | Teggatz et al. |
| 9,106,221 B2 | 8/2015 | Atrash et al. |
| 9,134,741 B2 | 9/2015 | Atrash et al. |
| 9,214,867 B2 | 12/2015 | Teggatz et al. |
| 9,225,199 B2 | 12/2015 | Teggatz et al. |
| 9,225,293 B2 | 12/2015 | Teggatz et al. |
| 9,231,400 B2 | 1/2016 | Chen et al. |
| 9,343,988 B2 | 5/2016 | Teggatz et al. |
| 9,354,268 B2 | 5/2016 | Teggatz et al. |
| 2011/0008527 A1 | 1/2011 | Teggatz et al. |
| 2011/0260536 A1 | 10/2011 | Roy et al. |
| 2012/0025752 A1 | 2/2012 | Teggatz et al. |
| 2012/0028845 A1 | 2/2012 | Teggatz et al. |
| 2012/0139357 A1 | 6/2012 | Teggatz et al. |
| 2012/0139358 A1 | 6/2012 | Teggatz et al. |
| 2012/0161721 A1 * | 6/2012 | Neethimanickam .... H02J 17/00 320/167 |
| 2012/0187897 A1 | 7/2012 | Lenk et al. |
| 2012/0188673 A1 | 7/2012 | Teggatz et al. |
| 2012/0248893 A1 | 10/2012 | Teggatz et al. |
| 2012/0274838 A1 | 11/2012 | Teggatz et al. |
| 2013/0002045 A1 | 1/2013 | Hassan-Ali et al. |
| 2013/0062967 A1 | 3/2013 | Teggatz et al. |
| 2013/0109443 A1 * | 5/2013 | Eaton ................ H04W 52/0248 455/572 |
| 2013/0175982 A1 | 7/2013 | Teggatz et al. |
| 2013/0181724 A1 | 7/2013 | Teggatz et al. |
| 2013/0193771 A1 | 8/2013 | Teggatz |
| 2013/0224679 A1 | 8/2013 | Teggatz et al. |
| 2013/0241465 A1 | 9/2013 | Teggatz et al. |
| 2013/0257171 A1 | 10/2013 | Teggatz et al. |
| 2013/0257172 A1 | 10/2013 | Teggatz et al. |
| 2014/0062381 A1 | 3/2014 | Teggatz et al. |
| 2014/0225447 A1 | 8/2014 | Teggatz |
| 2014/0329720 A1 | 11/2014 | Teggatz et al. |
| 2015/0171758 A1 | 6/2015 | Atrash et al. |
| 2015/0256227 A1 | 9/2015 | Teggatz et al. |
| 2015/0318899 A1 | 11/2015 | Teggatz et al. |
| 2015/0326118 A1 | 11/2015 | Teggatz et al. |
| 2015/0341087 A1 | 11/2015 | Moore et al. |
| 2015/0372676 A1 | 12/2015 | Teggatz et al. |
| 2016/0004267 A1 | 1/2016 | Atrash et al. |
| 2016/0033979 A1 | 2/2016 | Teggatz et al. |
| 2016/0105115 A1 | 4/2016 | Teggatz et al. |
| 2016/0134099 A1 | 5/2016 | Teggatz et al. |
| 2016/0134191 A1 | 5/2016 | Teggatz et al. |

* cited by examiner

SCALABLE HARVESTING SYSTEM AND METHOD

PRIORITY ENTITLEMENT

This non-provisional application is a continuation patent application of Ser. No. 13/772,190 filed Feb. 20, 2013, which claims priority from U.S. provisional application Ser. No. 61/601,138 filed Feb. 21, 2012, which are hereby incorporated by reference.

TECHNICAL FIELD

The disclosure relates to storage device charging systems. More particularly, the disclosure relates to scalable energy harvesting systems and methods for charging a storage device.

BACKGROUND

Over the past several years, the consumer electronics industry has revolutionized the way we work, communicate, entertain, and stay connected by providing us advanced mobile devices such as cell phones, smart phones, tablets, and e-readers. As part of this revolution, users now have the tools to access information and applications from any location, and are consuming power in places where they previously did not. This also means that the user may be dependent on battery power and could find they are unable to locate available power during inopportune moments. As people carry and use increasing numbers of portable electronic devices, they have a growing need to charge their batteries on the go because it is not typically feasible to plug a device into a wall outlet or vehicle adapter for a quick charge.

Thus, what is needed is a system for charging energy storage devices that provides portable charging functionality and improved speed of charging.

SUMMARY

One embodiment of the present invention concerns a scalable energy harvesting system comprising at least one charging control device, at least one energy harvesting device operatively coupled to the charging control device, and a plurality of bus based power connectors operatively coupled to the charging control device, wherein the charging control device directs a plurality of electrical currents.

Another embodiment of the present invention concerns a scalable energy harvesting system comprising at least one charging control device, at least one energy storage device operatively coupled to the charging control device; at least one energy harvesting device operatively coupled to the charging control device; and a plurality of bus based power connectors operatively coupled to the charging control device. In such an embodiment, the charging control device directs at least one harvested power input from the energy harvesting device and at least one bus based energy power input from the bus based power connectors to the energy storage device.

Still another embodiment of the present invention concerns a method of scalable energy harvesting comprising the steps of: receiving at least one power level of at least one energy storage device, receiving at least one harvested power input from at least one energy harvesting device, receiving at least one bus based energy power input from at least one bus based power connector, and implementing a charge pattern for the energy storage device based upon the power level of the energy storage device, the harvested power input, and the bus based energy power input.

BRIEF DESCRIPTION OF THE DRAWINGS

The present disclosure will be more clearly understood from consideration of the following detailed description and drawings in which.

Figure 1:
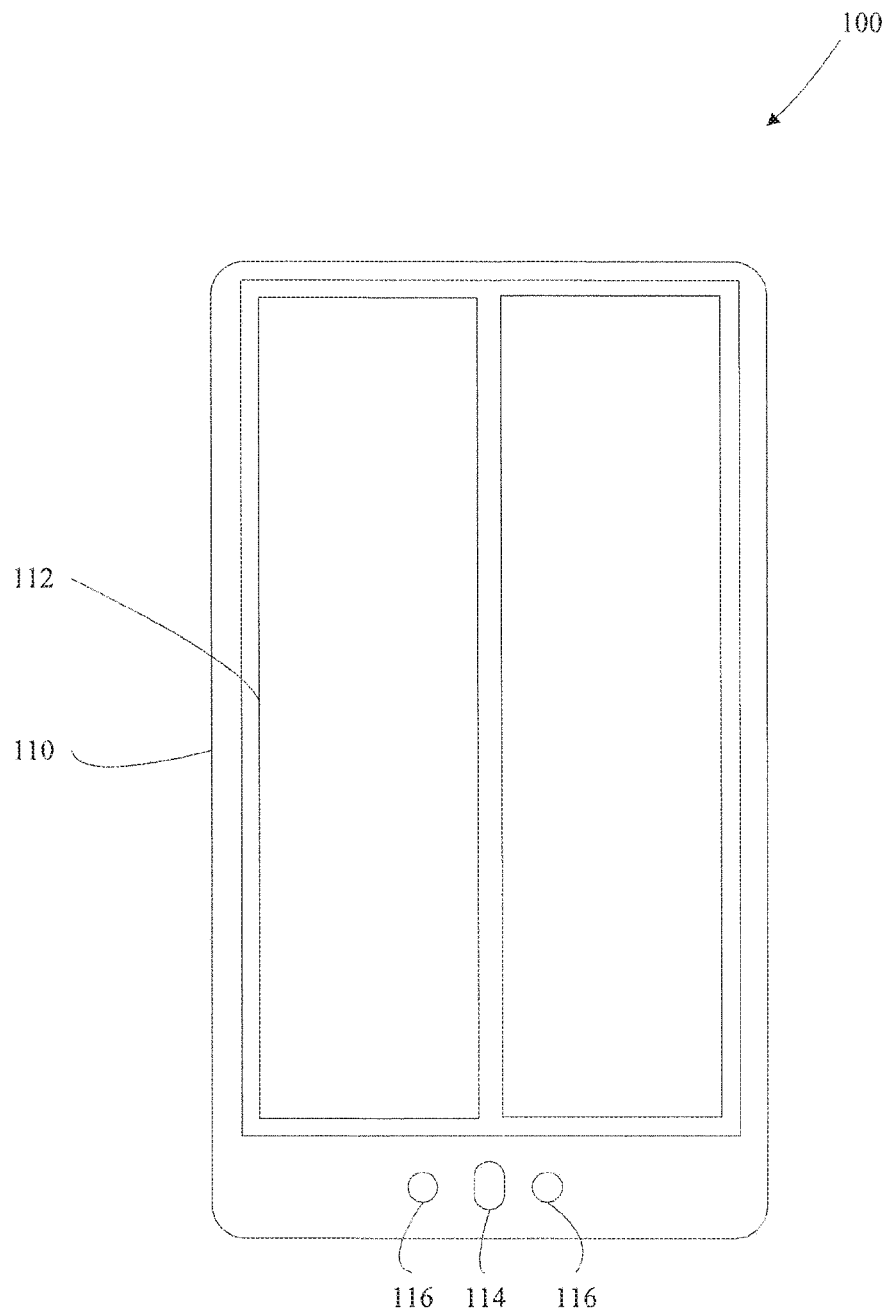
FIG. 1 shows an example of a scalable energy harvesting system.

References in the detailed description correspond to like references in the various drawings unless otherwise noted. Descriptive and directional teens used in the written description such as, for example, right, left, back, top, bottom, upper, side, et cetera, refer to the drawings themselves as laid out on the paper and not to physical limitations of the disclosure unless specifically noted. The drawings are not to scale, and some features of examples shown and discussed are simplified or amplified for illustrating principles and features as well as advantages of the disclosure.

DETAILED DESCRIPTION

The present disclosure is directed to scalable energy harvesting systems and their methods of use and production. In various embodiments, the scalable energy harvesting systems comprise a charging module housing. The charging module housing can provide structure and support to the scalable energy harvesting systems. Additionally, the scalable energy harvesting systems can also comprise a charging control device. In one or more embodiments, the charging control device can be a portable electronic device. For example, the charging control device can be a cellular phone, an e-tablet, and the like. The charging control device can have a means of charging an energy storage device such as, for example, a battery or a capacitor. The charging control device may also have a charging device attached to it; however, if a smaller charging device is utilized for portability, then this charging device may be inadequate by itself to adequately charge the energy storage device. In certain embodiments, the charging control device has a means to connect to a series and/or parallel stack of additional energy harvesting devices. These energy harvesting devices can include, for example, solar chargers, piezoelectric energy harvesting elements, radio frequency harvesting elements, electrostatic discharge harvesting elements, Seebeck energy harvesting elements, and combinations thereof.

The energy harvesting devices may be connected in any combination to the charging control device. The charging control device can be capable of controlling and managing all of the energy harvesting devices connected to it. In certain embodiments, it may be advantageous to connect more than type of energy harvesting device to the charging control device. For example, the charging control device can be connected to at least 2, 3, 4, 5, or 6 energy harvesting devices. In such embodiments, the energy storage device connected to the charging control device can be charged at a faster rate due to the utilization of more than one energy harvesting device.

In one or more embodiments, the charging control device may be implemented in combination with a portable electronic system such as, for example, cellular phones, MP3 players, portable tablets, laptops/netbooks, and the like. Power transfer from these portable devices may be controlled through a universal serial bus, a bus based power coupling, or wireless power methods. Wireless power methods can include, for example, near field magnetic coupling or far-field inductive resonance methods.

In certain embodiments, a portable charging control device is provided that can provide charging and extended battery life using energy harvested from the sun or other available alternative energy sources. For example, the charging control device may be coupled to a solar panel, a Qi®-compliant wireless charging receiver/transmitter, and at least one energy storage device (e.g., a high-capacity rechargeable Li-Ion battery). In addition, the portable charging control device may also contain more than one external port for connecting additional energy harvesting devices with the charging control device. In various embodiments, the charging control device has at least 2, 3, 4, 5, or 6 external ports that can be coupled to an energy harvesting device.

In one or more embodiments, the charging module housing may contain buttons for controlling and checking the state of the energy storage devices (e.g., the internal battery charge level) and indicator LEDs showing the USB charging input, solar charging input, wireless charging input, and charge levels of the energy storage devices (e.g., the internal battery charge level). It is envisioned that other combinations of integration and control could be implemented.

In various embodiments, the energy storage device in the scalable energy harvesting system can be charged by a solar panel, a wireless receiver, or a USB BC1.2 compliant input port. The energy storage device may be, for example, a rechargeable battery, a li-ion rechargeable battery, or a storage capacitor. In one or more embodiments, the charging control device is portable and thereby able to charge portable electronics devices via a USB BC1.2 compliant output port. In certain embodiments, the energy harvesting devices may be used individually or in parallel. It should be noted that other types or combinations of energy harvesting devices besides those noted above can be used. In addition, one or more energy harvesting devices can be externally added to the charging control device in order to reduce the charge time of the energy storage device.

The charging control device may also provide feedback when too much harvested energy is directed to the energy storage device. In this case, a light indication may be provided or an alternative storage element may be used to store any energy that is above and beyond what the charging control device determines is a safe charge for the energy storage device.

In one or more embodiments, the charging control device may be used with a non-control device such as, for example, backpacks, sunshades, furniture, umbrellas, and any other type of device that can incorporate or facilitate the presence of at least one energy harvesting system. In various embodiments, the charging module housing and charging control device may be used with a portable solar backpack. In one embodiment, the backpack contains a flexible solar panel (8"×10") placed inside a clear pouch on the outside of the backpack to provide charging energy. The charging module housing including the charging control device may be stored in a plastic holster inside a fabric pouch on the side of the backpack. This module may snap in and out of the holster and may have metallic pins for providing an electrical connection for transferring energy from the external solar panel to the charging control device.

The use of a larger secondary energy harvesting device may provide a quicker charge to the charging control device. In such embodiments, this allows for additional holsters to be placed in the backpack, thereby adding more possible connection points for additional charging control devices. Additional portable electronic devices can be connected to these holsters such as, for example, lights, fans, and/or any of the portable electronics noted above. These portable electronic devices may be clipped into the holster. In certain embodiments, these electronic devices may be integrated into the pack.

In various embodiments, the charging module housing and charging control device may be used with a portable solar car sunshade. The car sunshade may contain multiple solar panels attached to the exterior surface of a semi-rigid windshield shade to provide charging energy. In such embodiments, the charging module may be stored in a plastic holster on the interior side of the shade. This module may snap into and out of the holster and may have metallic pins that provide an electrical connection for transferring energy from the external solar panel to the charging control device.

Various implementations of the above embodiments may be combined. For example, several remote non-control devices, such as solar backpacks or solar window shades, can be hooked up together and provide charges to one or more charging control devices. Other types of non-control devices can be used beyond backpacks and car shades, such as furniture and umbrellas. Additional energy harvesting devices, such as a standalone solar panel, may be plugged into any combination of charging control devices and non-control devices. A non-control device can have one or more electronic loads.

As noted above, it is envisioned that in various embodiments described herein that one or more charging control devices can be connected to one or more energy harvesting devices.

In one or more embodiments, it is envisioned that the scalable energy harvesting system may comprise a portable charging housing module having an extended battery life device containing a high-capacity Li-Ion rechargeable battery and a built-in solar panel and/or a built-in Qi-compliant wireless power receiver to charge the internal Li-Ion battery. The portable system may also contain a built-in USB BC1.2 compliant input port to charge the internal Li-Ion battery. In addition, the built-in USB BC1.2 compliant input port may also be used to charge other portable rechargeable devices via a USB BC1.2 compliant output.

In various embodiments, the scalable energy harvesting system may comprise a backpack containing a solar panel for charging a removable portable charging module, a car sunshade containing solar panels for charging a removable portable charging module, or a portable charging module that slides inside a plastic holster and contains metallic pins for making an electrical connection to charge a built-in energy storage device.

In carrying out the principles of the present disclosure, the device and method described herein provide advances in regard to the harvesting and storage of energy. In certain embodiments described herein, systems and methods are described that include and utilize multiple energy harvesting systems.

The features and other details of the disclosure will now be more particularly described with reference to the accompanying drawings, in which various illustrative examples of the disclosed subject matter are shown and/or described. It will be understood that particular examples described herein are shown by way of illustration and not as limitations of the disclosure. These examples are provided so that this disclosure will be thorough and complete, and will fully convey the scope of the disclosed subject matter to those skilled in the art.

The terminology used herein is for the purpose of describing particular examples and is not intended to be limiting of the disclosed subject matter. As used herein the term "and/or" includes any and all combinations of one or more of the associated listed items. Also, as used herein, the singular forms "a", "an", and "the" are intended to include the plural forms as well, unless the context clearly indicates otherwise. It will be further understood that the terms "comprises," and/or "comprising" when used in this specification, specify the presence of stated features, integers, steps, operations, elements, and/or components, but do not preclude the presence or addition of one or more other features, integers, steps, operations, elements, components, and/or groups thereof. Also, as used herein, relational terms such as first and second, top and bottom, left and right, and the like may be used solely to distinguish one entity or action from another entity or action without necessarily requiring or implying any actual such relationship or order between such entities or actions.

Referring now to FIG. 1, there is illustrated a scalable energy harvesting system 100 having a charging module housing 110 comprising an energy harvesting device 112, a control switch 114, and an indicator 116. The energy harvesting device 112 can be, for example, a solar cell.

Figure 2:
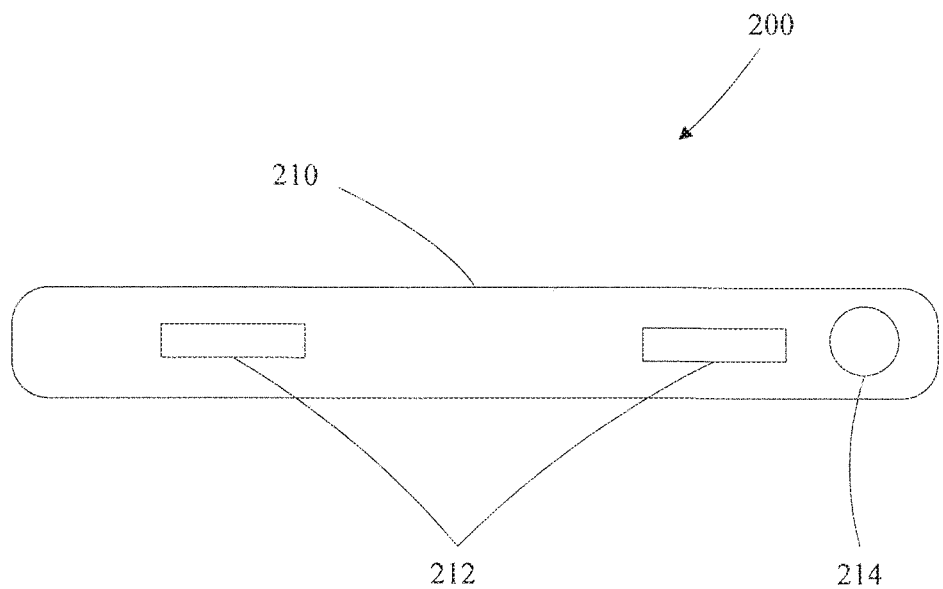
FIG. 2 shows the universal bus connections of a scalable energy harvesting system.

Referring now to FIG. 2, a scalable energy harvesting system 200 is illustrated having a charging module housing 210, multiple bus based power connectors 212, and a power supply connection 214.

Figure 3:
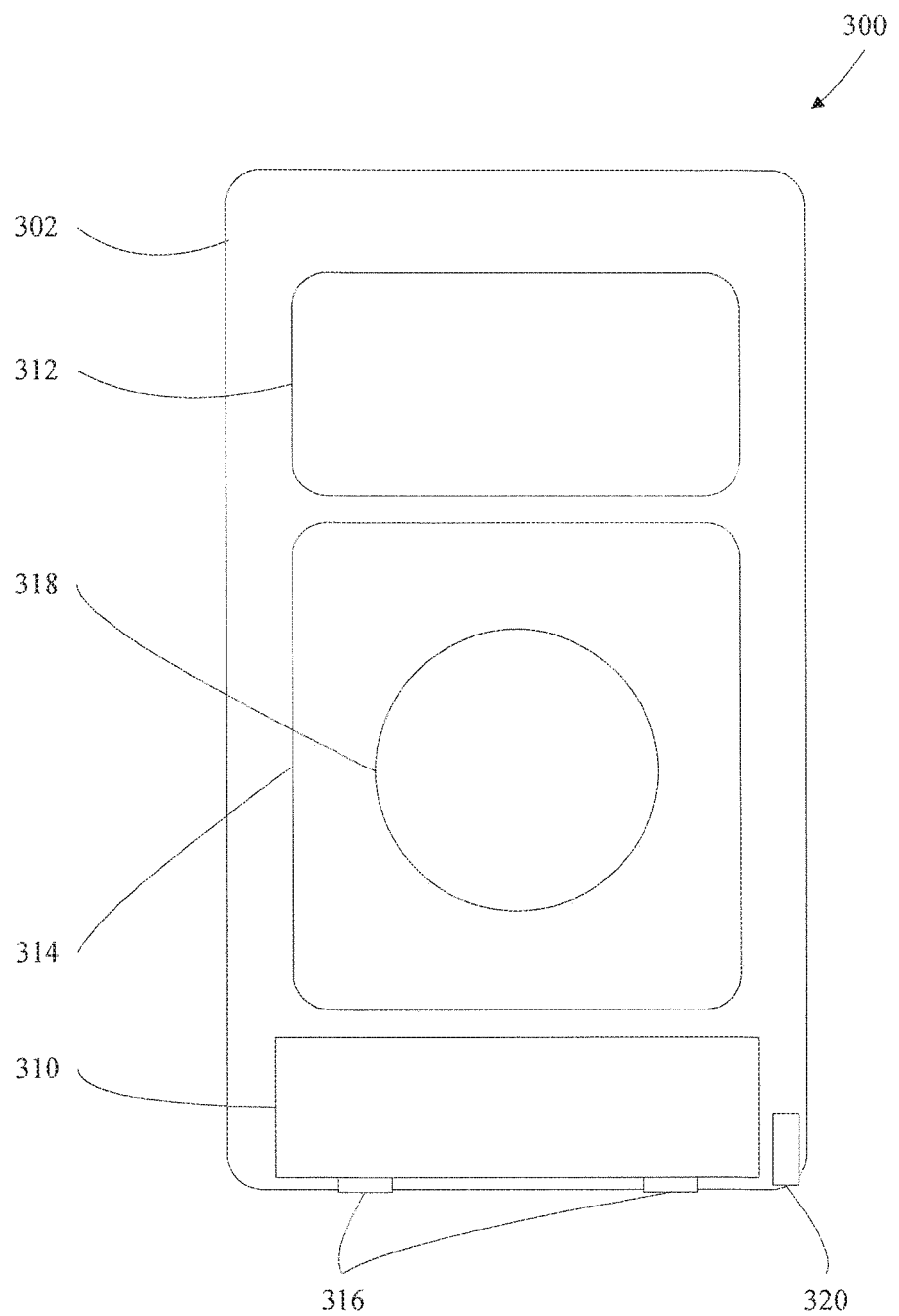
FIG. 3 shows the internals of a scalable energy harvesting system.

Referring now to FIG. 3, a scalable energy harvesting system 300 is illustrated that is formed from a charging module housing 302 comprising a charging control device 310, an energy storage device 312 responsive to the charging control device 310, an energy harvesting device 314, and a plurality of bus based power connectors 316 operatively coupled to the charging control device 310. The energy storage device 312 may be, for example, a rechargeable battery, a li-ion rechargeable battery, a storage capacitor, or the like.

In the embodiment depicted in FIG. 3, the charging control device 310 can direct the plurality of electrical currents serially and/or in parallel. The system 300 also comprises a wireless charging receiver 318. The wireless charging receiver 318 may be, for example, a magnetic coupling, an inductive resonance coupling, or the like. The system 300 also includes a power supply connection 320.

Referring again to FIG. 3, the energy harvesting device 314 can comprise, for example, a piezoelectric harvesting element, a radio frequency receiver, an electrostatic discharge receiver, or a Seebeck effect receiver.

Figure 4:
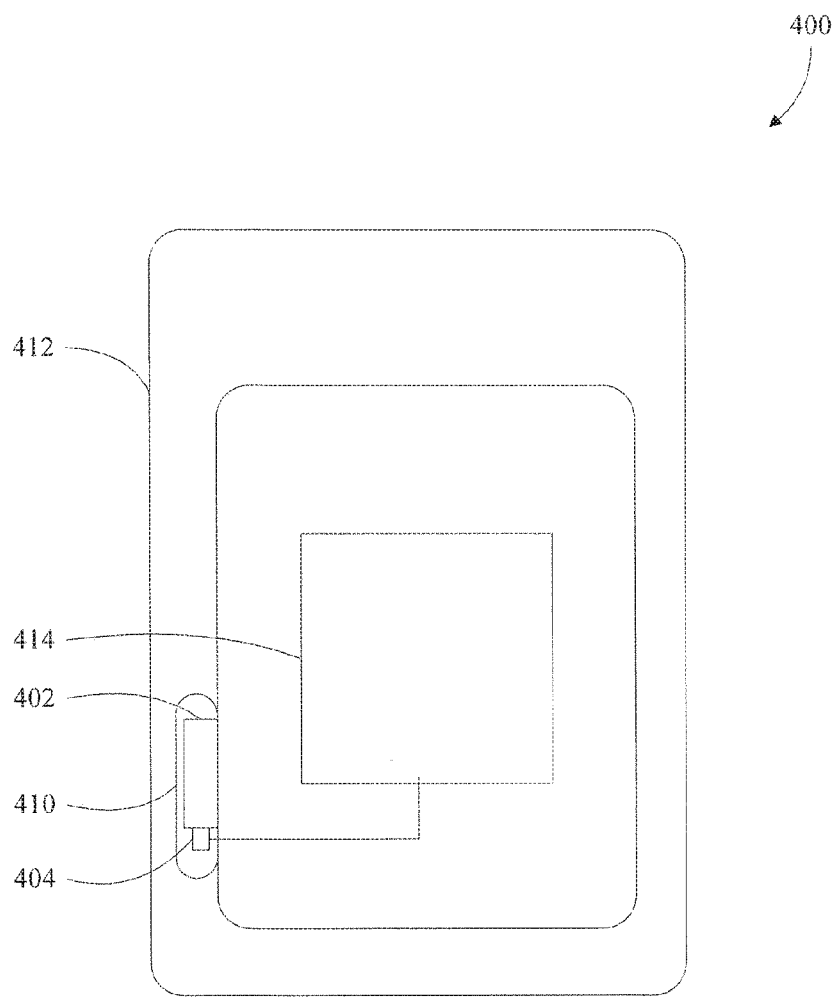
FIG. 4 shows a backpack based example of a scalable energy harvesting system.

Referring now to FIG. 4, a scalable energy harvesting system 400 is illustrated having a holster 410 connected to the charging module housing 402. The holster 410 contains at least one set of connection pins 404 that are electrically connectable to an energy storage device (not depicted). The system 400 also includes a backpack 412 and a solar panel 414 connected to the backpack 412.

Figure 5:
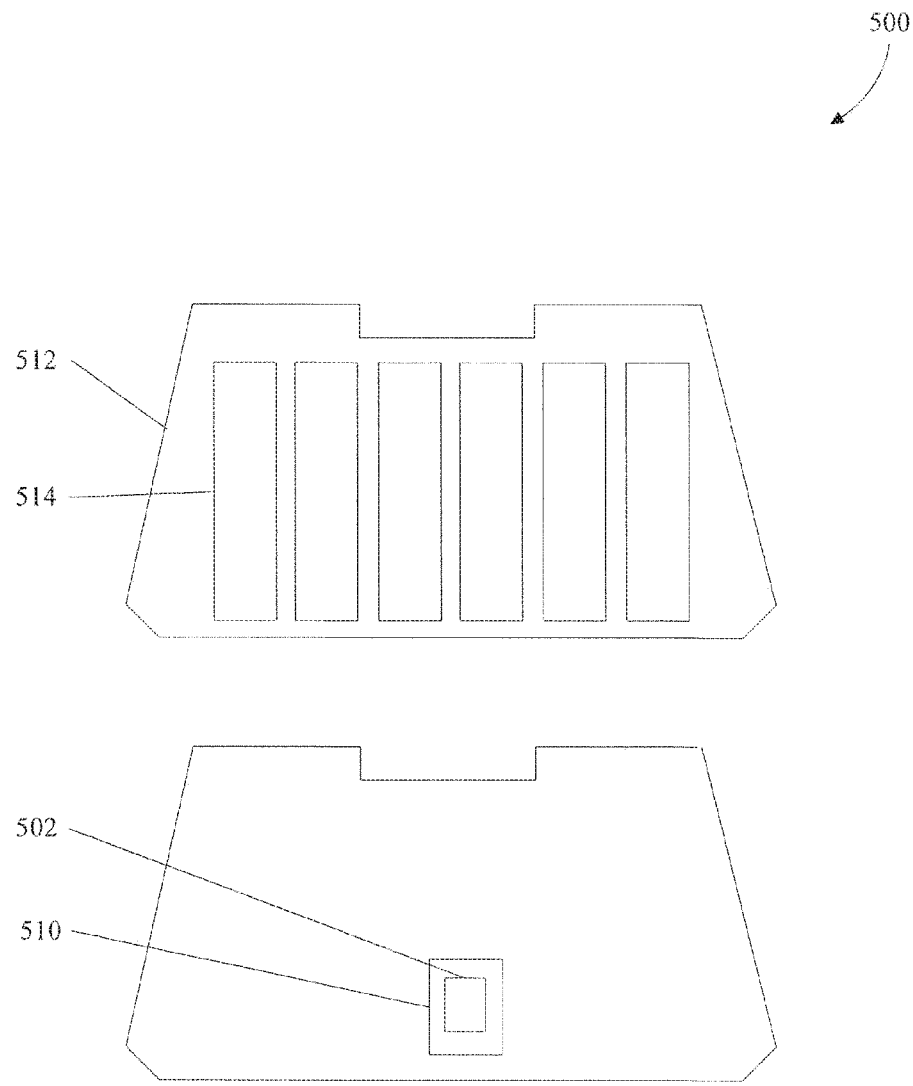
FIG. 5 shows a car sunshade based example of a scalable energy harvesting system.

Referring now to FIG. 5, a scalable energy harvesting system 500 is illustrated having a holster 510 that is connectable to a charging module housing 502. The holster 510 can have at least one set of connection pins that can be electrically connectable to an energy storage device (not depicted). The system 500 also includes a car sunshade 512 and at least one solar panel 514 connected to the car sunshade 512.

Figure 6:
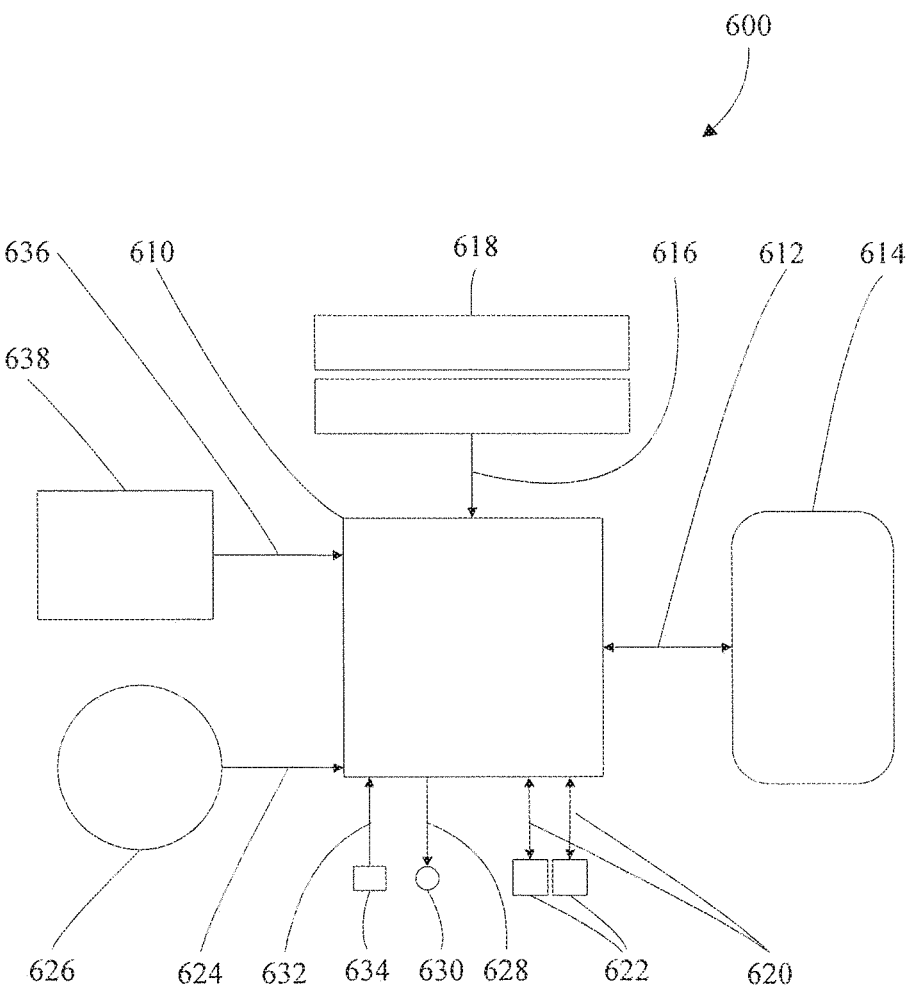
FIG. 6 shows an example of a scalable energy harvesting system.

Referring now to FIG. 6, a scalable energy harvesting system 600 is illustrated comprising a charging control device 610 and an energy storage device interface 612 that is operatively coupled to the charging control device 610 and electrically connected to an energy storage device 614. An energy harvesting device interface 616 is operatively coupled to the charging control device 610 and electrically connected to at least one energy storage device 618. A plurality of bus based power connector interfaces 620 are operatively coupled to the charging control device 610 and electrically connected to the bus based power connectors 622.

The embodiment depicted in FIG. 6 further comprises a wireless charging receiver interface 624 that is operatively coupled to the charging control device 610 and electrically connected to a wireless charging receiver 626. The system 600 also contains an indicator interface 628 that is operatively coupled to the charging control device 610 and electrically connected to an indicator 630. The system 600 also comprises at least one control switch interface 632 that is operatively coupled to the charging control device 610 and electrically connected to a control switch 634. A secondary energy storage device interface 636 is also operatively coupled to the charging control device 610 and electrically connected to a solar panel 638. Due to the configuration in FIG. 6, the charging control device 610 can direct harvested power input from the solar panel 638 and bus based energy power input from the bus based power connectors 622 to the energy storage devices 614, 618.

Figure 7:
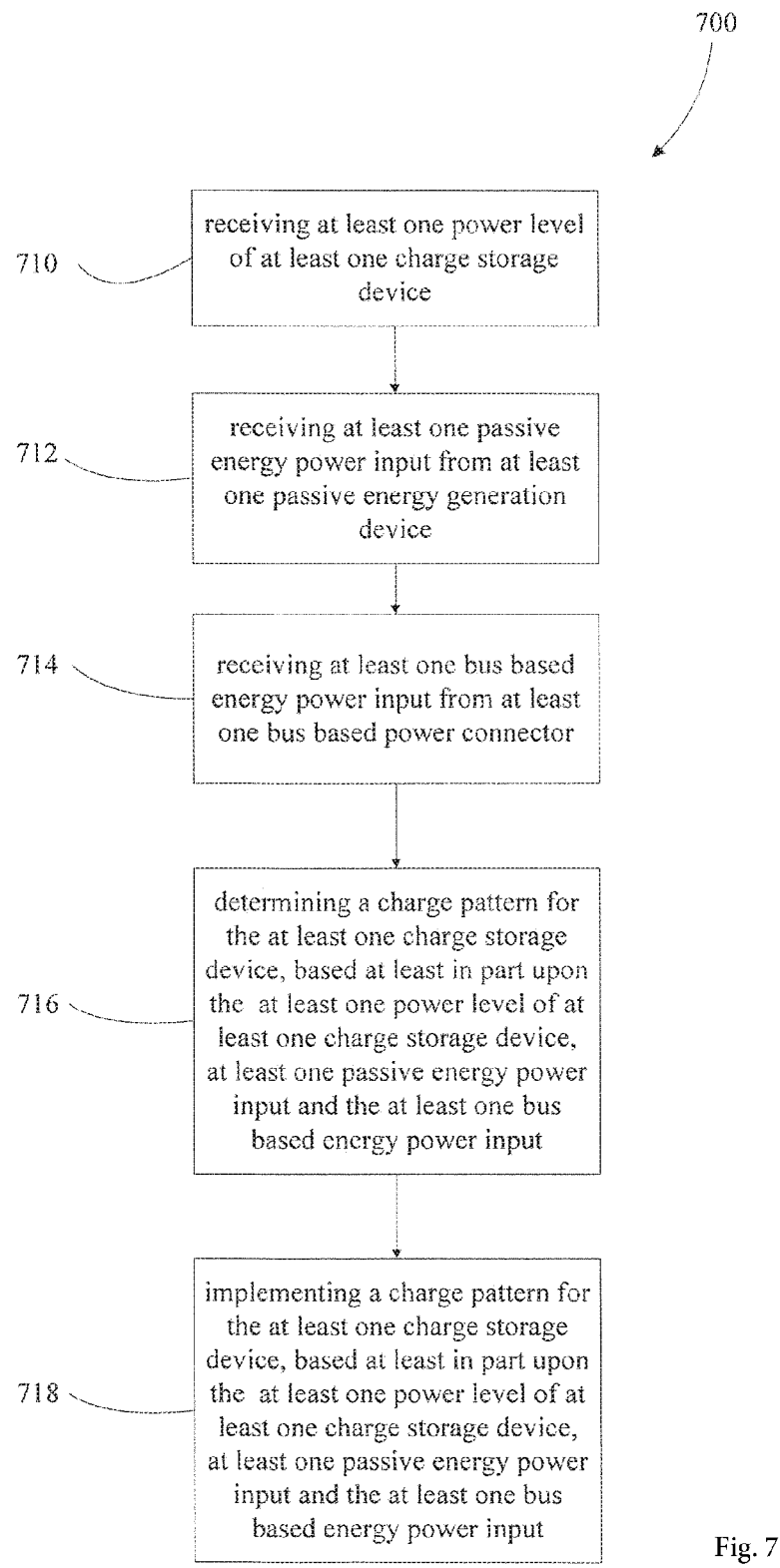
FIG. 7 shows an example of a method of scalable energy harvesting.

Referring now to FIG. 7, a method of scalable energy harvesting 700 is shown and described comprising the steps of receiving 710 at least one power level of at least one energy storage device, receiving 712 at least one harvested power input from at least one energy harvesting device, and receiving 714 at least one bus based energy power input from at least one bus based power connector. The method additionally comprises the steps of determining 716 a charge pattern for the energy storage device and implementing 718 the charge pattern based at least in part upon the power level of the energy storage device, the harvested power input, and the bus based energy power input.

Figure 8:
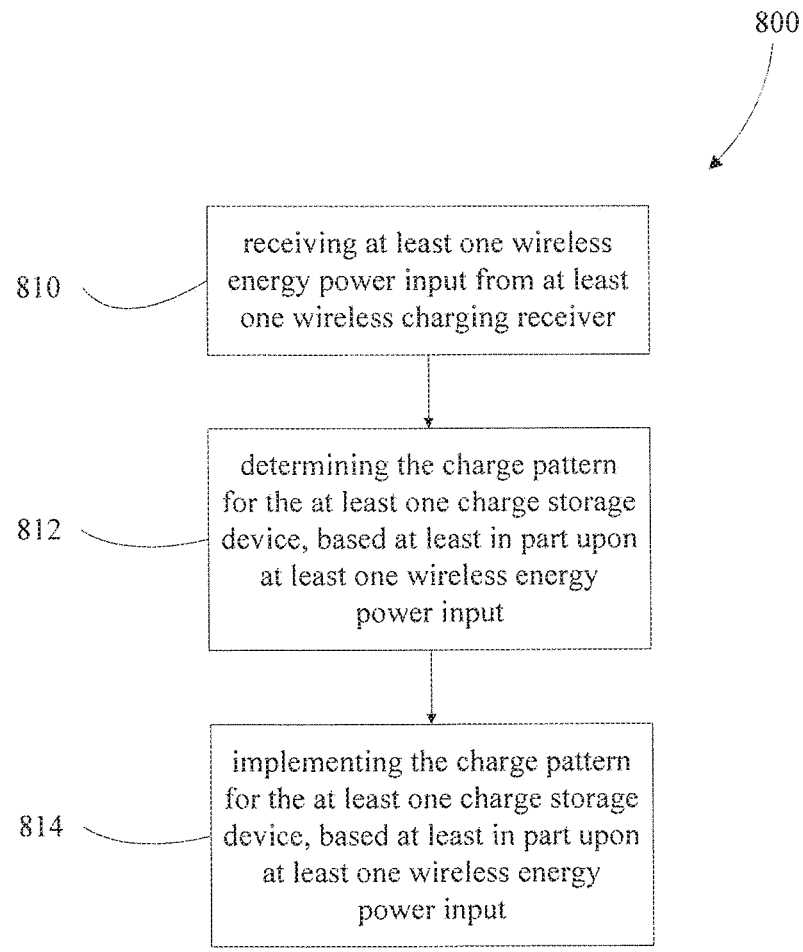
FIG. 8 shows an example of a method of scalable energy harvesting.

Referring now to FIG. 8, the method 800 originally described in FIG. 7 may further comprise the steps of receiving 810 at least one wireless energy power input from at least one wireless charging receiver and determining 812 and implementing 814 the charge pattern for the energy storage device based at least in part upon the wireless energy power input.

Figure 9:
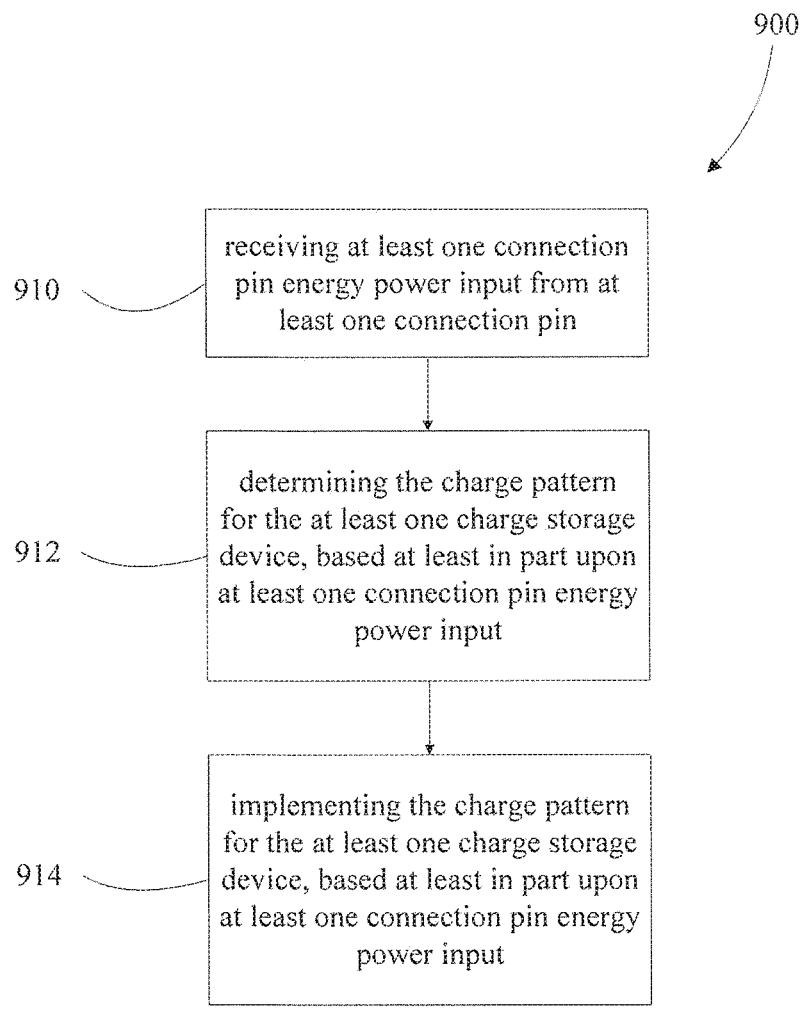
FIG. 9 shows an example of a method of scalable energy harvesting.

In FIG. 9, the method 900 originally described in FIG. 7 may further comprise the steps of receiving 910 at least one connection pin energy power input from at least one connection pin and determining 912 and implementing 914 the charge pattern for the energy storage device based at least in part upon the connection pin energy power input.

While the making and using of various exemplary examples of the disclosure are discussed herein, it is to be appreciated that the present disclosure provides concepts which can be described in a wide variety of specific contexts. It is to be understood that the device and method described herein may be practiced with cell phones, personal digital assistants, laptop computers, tablet computers, portable batteries, and associated apparatus. For purposes of clarity, detailed descriptions of functions, components, and systems familiar to those skilled in the applicable arts are not included. The methods and apparatus of the disclosure provide one or more advantages including, but are not limited to, portable energy and high efficiency passive charging of devices. While the disclosure has been described with reference to certain illustrative examples, those described herein are not intended to be construed in a limiting sense. For example, variations or combinations of steps or materials in the examples shown and described may be used in particular cases while not departing from the disclosure. Various modifications and combinations of the illustrative examples as well as other advantages and examples will be apparent to persons skilled in the arts upon reference to the drawings, description, and claims.

What is claimed is:

1. A system, comprising:
    at least one charging control device;
    an inductive resonance coupling operatively coupled to the charging control device and configured to transfer energy from or to the charging control device; and
    a plurality of energy harvesting devices inductively coupled to the charging control device, wherein the charging control device directs a plurality of electrical currents from the plurality of energy harvesting devices, wherein the charging control device selectively conducts the plurality of electrical currents in parallel over one or more bus based power connectors to an energy storage device and selectively conducts the plurality of electrical currents in parallel over the one or more bus based power connectors from the energy storage device in accordance with a charge pattern.

2. The system of claim 1 wherein the charging control device conducts the plurality of electrical currents serially over one or more bus based power connectors to an energy storage device.

3. The system of claim 1 further comprising at least one wireless charging receiver operatively coupled to the charging control device and configured to operate in accordance with a charge pattern.

4. The system of claim 1 wherein one or more of the energy harvesting devices comprise a solar cell.

5. The system of claim 1 further comprising a magnetic coupling operatively coupled to the charging control device and configured to transfer energy from or to the charging control device.

6. The system of claim 1 further comprising a power supply connection operatively coupled to the charging control device and configured to transfer energy from or to the charging control device and configured to operate in accordance with a charge pattern.

7. The system of claim 1 further comprising an energy storage device operatively coupled to the charging control device and configured to transfer energy from or to the charging control device and to operate in accordance with a charge pattern.

8. The system of claim 7 wherein the energy storage device comprises a rechargeable battery.

9. The system of claim 1 wherein the charging control device is a portable electric device.

10. The system of claim 1 wherein one or more of the energy harvesting devices comprise a solar cell, a piezoelectric element, a radio frequency receiver, an electrostatic discharge receiver or a Seebeck effect receiver.

11. The system of claim 1 further comprising a charging module housing connected to the energy harvesting device.

12. The system of claim 11 further comprising:
    a holster connectable to the charging module housing; and
    a set of connection pins connected to the holster, wherein the set of connection pins electrically are connectable to an energy storage device.

13. The system of claim 12 wherein one or more of the energy harvesting devices comprise a vehicle-mounted solar panel.

14. A system, comprising:
    at least one charging control device;
    at least one energy storage device operatively coupled to the charging control device and configured to provide energy to or receive energy from the charging control device; and
    at least one wireless charging receiver inductively coupled to the charging control device and configured to provide energy to and receive energy from the charging control device; wherein the charging control device selectively conducts a plurality of electrical currents in parallel over one or more bus based power connectors to the energy storage device and selectively conducts the plurality of electrical currents in parallel over the one or more bus based power connectors from the energy storage device in accordance with a charge pattern.

15. The system of claim 14 further comprising a plurality of energy harvesting devices operatively coupled to the charging control device and configured to selectively provide energy to or receive energy from the charging control device in accordance with the charge pattern.

16. The system of claim 15 wherein the charging control device directs at least one harvested power input from the energy harvesting device and at least one bus based energy power input from a bus based power connectors to the energy storage device.

17. The system of claim 14 further comprising a plurality of bus based power connectors operatively coupled to the charging control device and configured to provide energy to or receive energy from the charging control device in accordance with the charge pattern.

18. The system of claim 14 further comprising at least one indicator operatively coupled to the charging control device and configured to display one or more system status.

19. A method comprising:
    receiving at least one wireless energy power input from at least one wireless charging receiver;
    implementing a charge pattern for a storage device as a function of 1) a power level of an energy storage device, 2) a harvested power input of an energy harvesting device, 3) a bus based energy power input of a bus based power connector, and 4) a wireless energy power input by selectively conducting a plurality of electrical currents in parallel over one or more bus based power connectors from a charging control device to the energy storage device; and
    selectively conducting the plurality of electrical currents in parallel over the one or more bus based power connectors from the energy storage device in accordance with the charge pattern.

\* \* \* \* \*